(12) United States Patent
Liang

(10) Patent No.: US 7,481,622 B1
(45) Date of Patent: Jan. 27, 2009

(54) TURBINE AIRFOIL WITH A SERPENTINE FLOW PATH

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 309 days.

(21) Appl. No.: 11/472,249

(22) Filed: Jun. 21, 2006

(51) Int. Cl.
*F01D 5/18* (2006.01)

(52) U.S. Cl. .................................... 416/97 R; 415/115
(58) Field of Classification Search .................. 415/115; 416/96 R, 97 R
See application file for complete search history.

(56) References Cited

U.S. PATENT DOCUMENTS

| | | | |
|---|---|---|---|
| 5,356,265 A | 10/1994 | Kercher | |
| 5,538,394 A | 7/1996 | Iomata et al. | |
| 5,660,524 A | 8/1997 | Lee et al. | |
| 5,690,473 A | 11/1997 | Kercher | |
| 5,813,835 A | 9/1998 | Corsmeier et al. | |
| 6,036,441 A | 3/2000 | Mnning et al. | |
| 6,168,381 B1 | 1/2001 | Reddy | |
| 6,183,198 B1 * | 2/2001 | Manning et al. | 416/97 R |
| 6,206,638 B1 * | 3/2001 | Glynn et al. | 416/97 R |
| 6,595,748 B2 | 7/2003 | Fodman et al. | |

* cited by examiner

*Primary Examiner*—Ninh H Nguyen
(74) *Attorney, Agent, or Firm*—John Ryznic

(57) ABSTRACT

A turbine airfoil, such as a blade, having a leading edge cooling circuit for cooling the leading edge of the airfoil, and a separate serpentine cooling circuit for cooling the remaining portion of the airfoil. The serpentine circuit includes a first leg connecting a plurality of discharge holes for cooling the trailing edge of the airfoil, and a third leg connected to a plurality of film cooling holes to cool the pressure side wall of the airfoil. A suction side wall compartment is connected to the third leg of the serpentine circuit through a plurality of metering holes, the suction side compartment supplying a plurality of film cooling holes to cool the suction side wall of the airfoil. The compartment can be one long compartment or a plurality of separate compartment each connected by a metering hole to the third leg. The metering holes allow for an increased flow through velocity of the cooling fluid in the third leg and therefore a higher heat transfer coefficient to promote cooling of the airfoil.

13 Claims, 3 Drawing Sheets

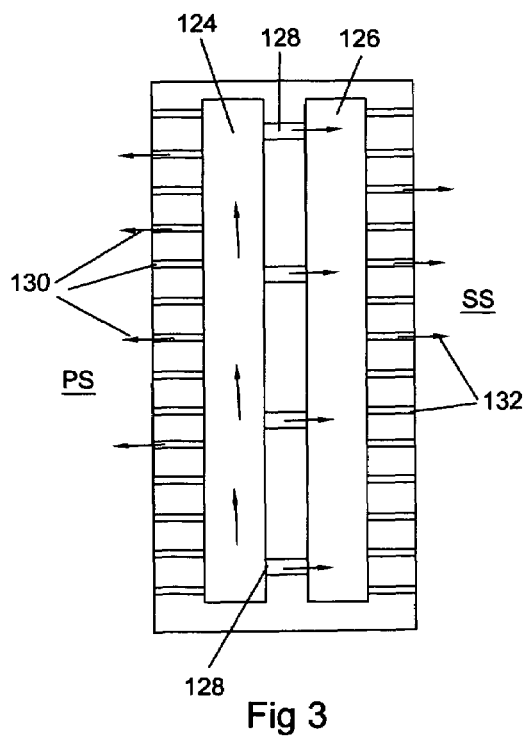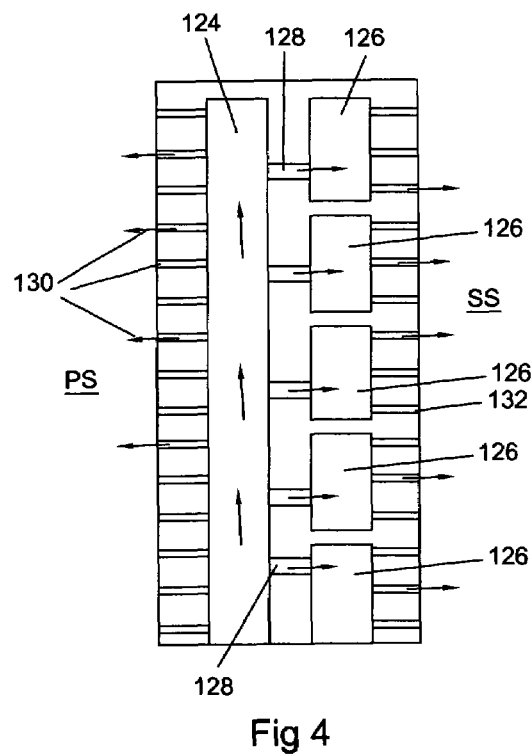

US 7,481,622 B1

TURBINE AIRFOIL WITH A SERPENTINE FLOW PATH

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates to gas turbine engines, and more specifically to cooling of turbine airfoils.

2. Description of the Related Art Including Information Disclosed under 37 CFR 1.97 and 1.98

In a gas turbine engine, air is pressurized in a compressor and mixed with fuel and ignited in a combustor for generating hot combustion gases. The hot gases flow downstream through turbine stages which extract energy therefrom for powering the compressor and producing useful work, such as powering a fan for propelling an aircraft in flight.

A high pressure turbine is disposed immediately downstream from the combustor and receives the hottest combustion gases from the combustor. The first stage turbine rotor blades have hollow airfoils which are supplied with a portion of air bled from the compressor for use as a coolant in removing heat from the blades during operation.

Each airfoil includes pressure and suction sidewalls joined together at opposite leading and trailing edges, and extending from root to tip. A platform is disposed at the airfoil root and defines a portion of the radially inner flow path for the combustion gases. And, a dovetail is integrally jointed to the platform for mounting the individual blades in corresponding dovetail slots in the perimeter of a rotor disk.

Since the airfoil leading edge first engages the hot combustion gases, it requires substantial cooling for obtaining a useful blade life. Heat load from the combustion gases varies around the outer surface of the airfoil from the leading to trailing edges, and along the pressure and suction sidewalls. Various cooling circuits are provided inside the airfoil for cooling the different portions thereof. The different portions of the airfoil therefore operate at different temperatures, which introduce thermal stress therein that affect low cycle fatigue life of the blade.

Airfoil cooling may be affected using convection cooling, film cooling, or impingement cooling, or combinations thereof. The leading edge of a first stage turbine airfoil typically includes several rows or columns of film cooling holes fed by a common leading edge flow chamber or channel. Other film cooling holes and trailing edge holes may be fed by corresponding internal channels, such as multi-pass serpentine cooling channels.

The airfoil may include additional film cooling holes disposed in either sidewall (pressure side or suction side) downstream of the leading edge, which are typically referred to as gill holes. Since the gill holes are typically provided with a common source of coolant inside the airfoil, and the pressure of the combustion gases outside of the airfoil varies, backflow margin across the gill holes may vary on opposite sides of the airfoil.

Backflow margin is defined as the pressure of the coolant inside the airfoil divided by the local pressure of the combustion gases outside the airfoil as experienced by each of the gill holes. Sufficient backflow margin must be maintained to prevent ingestion of the hot combustion gases into the airfoil, and ensure continuous discharge of the coolant through the gill holes.

Since the minimum required backflow margin must be set at the airfoil leading edge pressure sidewall, the backflow margin on the lower suction sidewall of the airfoil may be undesirably high.

FIG. 1a shows a typical Prior Art (1+3) serpentine cooling design for the first blade of the turbine. The flow path for the 3-pass flow circuit is also shown in FIG. 1b. The airfoil includes a first leading edge cooling passage 2, film cooling holes 8 to deliver cooling air from the leading edge cooling passage 2 to a second leading edge cooling passage 4, a 3-pass serpentine passage having a first leg 20, a second leg 22, and a third leg 24, and trailing edge film cooling passages 40 supplied by cooling air from the first leg 20 of the serpentine passage. Cooling air from the third leg 24 is discharged onto the pressure side and suction side of the blade through pressure side film cooling holes 30 and suction side film cooling holes 32. For a forward flowing 3-pass serpentine cooling design used in the airfoil mid-chord region, the cooling air flows toward and discharges into the high pressure hot gas side pressure section of the pressure side of the blade. In order to satisfy the back flow margin criteria, a high cooling supply pressure is needed in order to prevent the hot gases from flowing into the airfoil.

Since the last leg of the 3-pass serpentine cavities provides film cooling air for both sides of the airfoil, in order to satisfy the back flow margin criteria for the pressure side film row, the internal cavity pressure must be approximately 10% higher than the hot gas pressure of the pressure side of the airfoil. When the cooling air is bled off from the cavity for cooling both the pressure and suction sidewalls, the spanwise internal Mach number becomes lower. This translates to a lower through-flow velocity and lower cooling side internal heat transfer coefficient. The high pressure required preventing inflow from the high pressure side of the airfoil (the pressure side) results in an over-pressuring of the airfoil suction side film holes since the film cooling holes of the pressure side and the suction side is connected to the same cavity.

The U.S. Pat. No. 6,168,381 B1 issued to Reddy on Jan. 2, 2001 and entitled AIRFOIL ISOLATED LEADING EDGE COOLING discloses a serpentine cooling passage design in which an isolation flow chamber (38 in FIG. 3 of this patent) is positioned between a pressure side and suction side flow channels (40 and 42 in FIG. 3), where the pressure side and suction side flow channels are the last leg in a 3-pass serpentine flow circuit, both being supplied with cooling air from a common first and second legs of the 3-pass serpentine circuit. Because both pressure side and suction side flow channels are supplied from the same upstream cooling air passage, the pressures in the pressure and suction side flow channels are the same. The same problem described above exists in the Reddy patent: a high pressure is required to prevent inflow of the hot gasses on the pressure side of the airfoil, and the suction side channel is over-pressurized resulting in excessive flow through the film cooling holes on the suction side of the airfoil.

U.S. Pat. No. 6,595,748 B2 issued to Flodman et al on Jul. 22, 2003 and entitled TRICHANNEL AIRFOIL LEADING EDGE COOLING shows a turbine blade with a 3-pass serpentine flow circuit on the aft end of the blade with a first leg feeding cooling air to the trailing edge discharge holes and a third leg (58 in FIG. 3 of this patent) feeding cooling air to the pressure side film cooling holes and to a suction side cooling channel (second side channel 46 in FIG. 3 of this patent) which feeds cooling air to the suction side of the blade through suction side film cooling holes. A first side channel (44 in FIG. 3 of this patent) feeds cooling air to a shower head arrangement on the leading edge of the blade. The first side channel and the second side channel are on opposite sides of the blade. In the Reddy flow circuit, the suction side channel is still part of the serpentine flow circuit. A metering hole (56 in FIG. 3 of this patent) to feed cooling air to the channel for suction side cooling reduces the pressure and results in lower cooling flow and less cooling. The Flodman patent suffers from the same problem as in the Reddy patent. The supply of cooling air to the suction side of the blade is from a cooling channel (46 in FIG. 3 of this patent) which is delivered through a metering hole (52 in FIG. 3 of this patent). The metering hole reduces the pressure and provides less cooling flow through the cooling channel.

BRIEF SUMMARY OF THE INVENTION

The present invention is a turbine blade with a serpentine cooling circuit separate from a leading edge cooling circuit. The leading edge is supplied with cooling air from a leading edge channel, and the pressure and suction sides of the blade from a serpentine cooling circuit. A second leg of the serpentine cooling circuit supplies a third leg, the third leg discharging cooling air to pressure side wall film cooling holes. A suction side cooling compartment is located on the opposite side of the blade from the third leg channel, and supplies with cooling air through metering holes that provide backside impingement cooling for the suction side wall compartment. As a result of the cooling circuit design of the present invention, the cooling air flows through the pressure side wall cavity first and therefore enhances the internal Mach number and the heat transfer coefficient on the airfoil pressure side wall. In addition, impingement cooling for the airfoil suction side wall also generates a high internal heat transfer capability. Other than increasing the cooling side internal performance, the pressure ration across the suction side film cooling is also regulated by the metering holes to achieve an improved pressure ratio across the film cooling holes. An improved buildup of suction side film sub-layer can be obtained which yields higher suction side film effectiveness.

BRIEF DESCRIPTION OF THE SEVERAL VIEWS OF THE DRAWINGS

FIG. 3 shows a cut-away view of the blade of FIG. 2a.

FIG. 4 shows cut-away view of a second embodiment of the blade of FIG. 2a.

DETAILED DESCRIPTION OF THE INVENTION

Figure 1A:
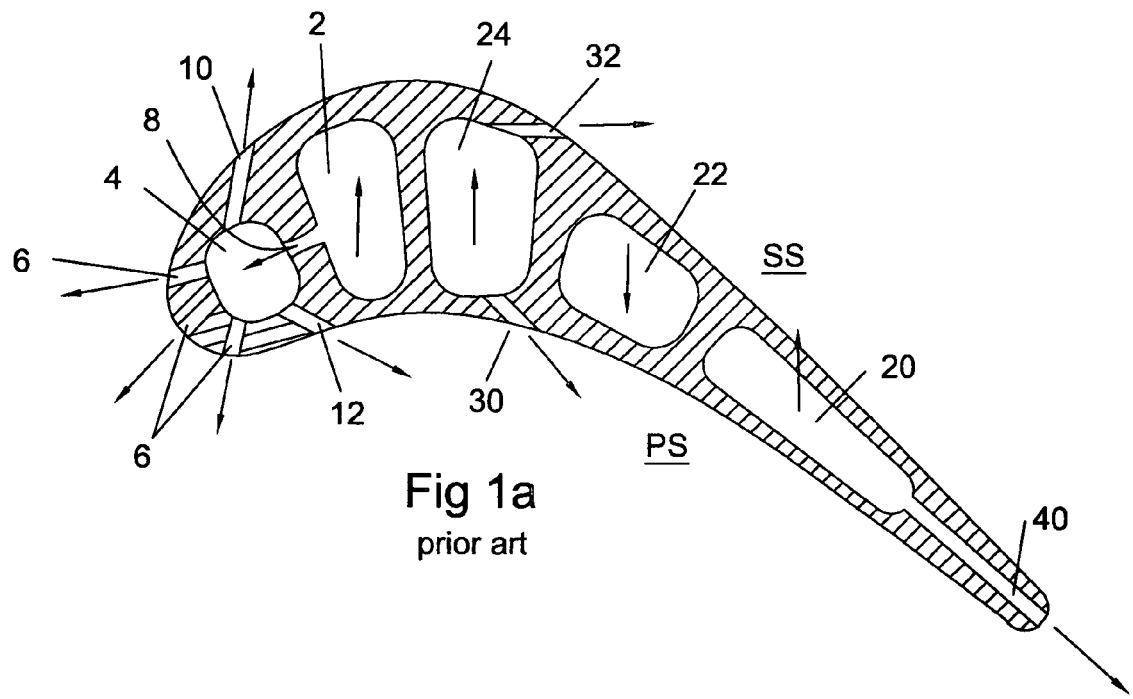
FIG. 1a shows a top cross section view of a Prior Art turbine blade having a single 3-pass serpentine flow passage.
Figure 1B:
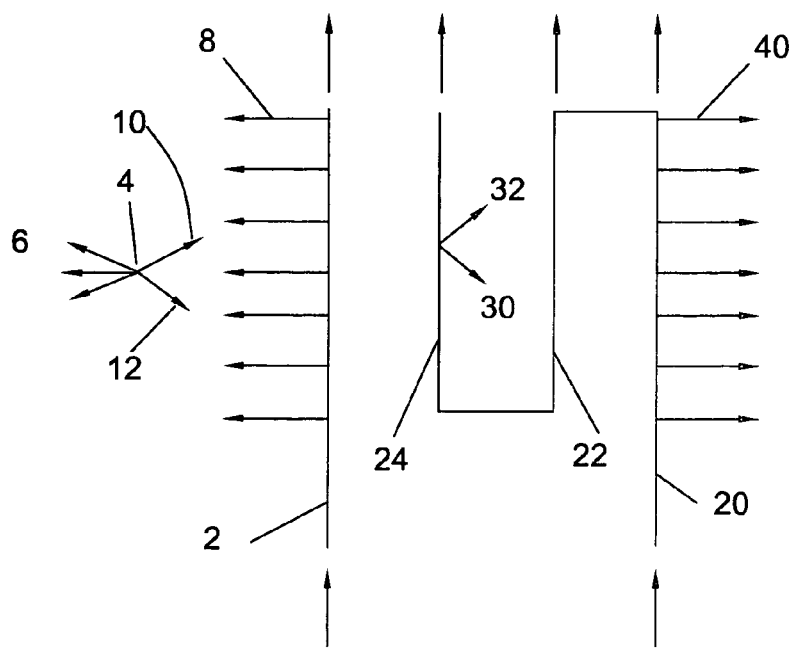
FIG. 1b shows a diagram representing the flow paths for the FIG. 1a design.
Figures 2A, 2B:
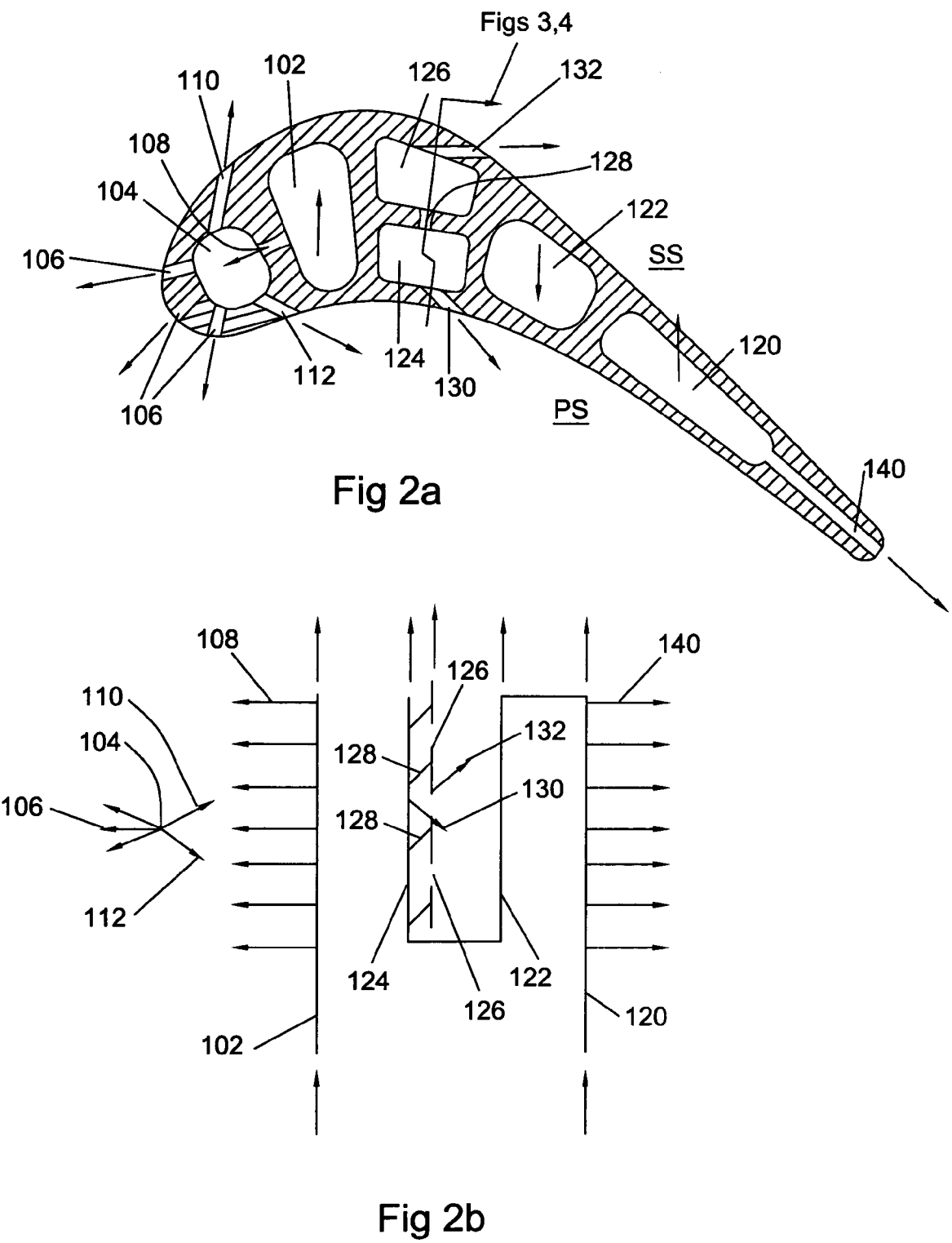
FIG. 2a shows a top cross section view of a turbine blade of the present invention; and, FIG. 2b shows a diagram representing the flow paths for the FIG. 2a turbine blade of the present invention.

The turbine airfoil of the present invention is shown in FIGS. 2a. The present is shown as a turbine blade, but can be used in a turbine vane as well. The turbine blade includes a pressure side (PS) which is also referred to as the concave side of the blade, and a suction side (SS) which is also referred to as the convex side. The blade includes a 3-pass serpentine cooling passages to provide cooling air flow through the pressure side and the suction side of the blade. A leading edge of the blade is cooled by a shower head arrangement that is supplied with cooling air through a leading edge cooling supply channel 102. The shower head cooling holes 106 are supplied by an impingement cooling cavity 104, which is supplied with cooling air through impingement cooling holes 108 and the leading edge cooling air supply channel 102. Pressure side film cooling holes 112 and suction side film cooling holes 110 discharge cooling air from the impingement cooling compartment 104. The leading edge supply channel 102 and the leading edge impingement cavity 104 are considered to be the leading edge cooling circuit.

The pressure side and suction side walls of the blade are supplied with cooling air through a serpentine cooling circuit having a first leg 120 near the trailing edge of the blade which delivers cooling air to a plurality of trailing edge discharge holes 140. The first leg passes flow to a second leg 122 such that both the first and second legs provide cooling to both pressure side and suction side walls. A third leg 124 of the serpentine circuit is delivered cooling air and discharges cooling air to pressure side wall film cooling holes 130. The suction side wall is cooled by cooling air flowing through a suction side wall compartment 126, which communicates with the third leg 124 of the serpentine circuit through a plurality of metering holes 128. Suction side wall film cooling holes 132 discharge cooling air to the blade from the suction side wall compartment. The suction side wall compartment 126 of the present invention can be one compartment extending from the bottom of the blade to the top of the blade, or it can be a plurality of short compartments each separated from the other compartments and each connected to the third leg 124 of the serpentine circuit through one or more metering holes 128. The metering holes 128 provide backside impingement cooling for the suction side wall compartment 126. The three legs (120, 122, and 124) of the serpentine circuit are considered to be the serpentine cooling circuit. The first leg 120 and the second leg 122 are the only cooling paths located between the pressure side wall and the suction side wall of the airfoil and are therefore considered to provide cooling for both walls of the airfoil. The third leg 124 provides cooling for the pressure side wall, but is not considered to provide cooling for the suction side wall because the suction side compartment 126 is positioned between the third leg 124 and the suction side wall.

FIG. 3 shows a slice of the blade from FIG. 2a, where the suction side wall compartment 126 is a single compartment with a plurality of metering holes 128 connecting the third leg 124 of the serpentine circuit. FIG. 4 shows a slice of the blade from FIG. 2a in which the single compartment of FIG. 3 is replaced with a plurality of short compartments 126. Each compartment is connected to the third leg 124 of the serpentine circuit by one or more metering holes 128.

Because of the suction side wall cooling compartment(s) of the present invention and the metering holes leading into the compartment(s) from the serpentine circuit, the cooling air flow velocity in the last leg of the serpentine circuit does not drop off as in the above-cited prior art patents, resulting in a low heat transfer coefficient (the prior art). Thus, in the present invention, the third or last leg of the serpentine circuit maintains a high heat transfer coefficient and, therefore, the pressure side wall cooling rate is improved.

I claim:

1. A turbine airfoil having a pressure side wall and a suction side wall, the turbine airfoil comprising:

a leading edge cooling circuit to supply film cooling to a leading edge of the airfoil;

a serpentine circuit separate from the leading edge cooling circuit, the serpentine circuit including a first leg located near a trailing edge of the airfoil, a second leg downstream from the first leg, and a third leg located adjacent to and partially bounded by the pressure side wall of the airfoil such that near-wall cooling of the pressure side wall is performed;

a plurality of pressure side wall film cooling holes opening onto the pressure side wall of the airfoil and communicating with the third leg of the serpentine circuit;

a suction side wall compartment located adjacent to the suction side wall of the airfoil such that near-wall cooling of the suction side wall is performed and opposed to the third leg of the serpentine circuit;

a plurality of suction side wall film cooling holes opening onto the suction side wall of the airfoil and communicating with the suction side wall compartment; and, a plurality of metering holes connecting the third leg of the serpentine circuit to the suction side wall compartment.

2. The turbine airfoil of claim 1, and further comprising:
the suction side wall compartment comprises a plurality of short compartments, each compartment including at least one metering hole to connect the compartment to the third leg of the serpentine circuit, and each compartment including at least one film cooling hole to supply film cooling air to the suction side wall of the airfoil.

3. The turbine airfoil of claim 1, and further comprising:
a plurality of trailing edge discharge holes connected to the first leg of the serpentine circuit to supply cooling air to the trailing edge of the airfoil.

4. The turbine airfoil of claim 1, and further comprising:
the first leg and the second leg of the serpentine circuit provide cooling for both the pressure side and the suction side walls of the airfoil.

5. A process for cooling a turbine airfoil, the turbine airfoil comprising a leading edge cooling circuit and a separate serpentine circuit including a first leg located near a trailing edge of the airfoil, a second leg downstream from the first leg, and a third leg located adjacent to and partially bounded by the pressure side wall of the airfoil, the process comprising the steps of:

supplying a cooling fluid to the leading edge cooling circuit to cool a leading edge of the airfoil;

diverting a portion of the cooling fluid in the third leg of the serpentine cooling circuit directly through a film cooling hole on the pressure side of the airfoil;

diverting a portion of the cooling fluid from the third leg of the serpentine cooling circuit to a suction side wall compartment through a metering hole to perform near-wall cooling of the pressure side wall; and, diverting a portion of the cooling fluid in the suction side wall compartment through a film cooling hole on the suction side wall of the airfoil.

6. The process for cooling a turbine airfoil of claim 5, and further comprising the step of:

the step of diverting a portion of the cooling fluid from the third leg of the serpentine cooling circuit to a suction side wall compartment through a metering hole includes providing a plurality of separate compartment each with a metering hole for metering cooling fluid from the third leg, and each compartment having a film cooling hole for cooling the suction side wall of the airfoil.

7. The process for cooling a turbine airfoil of claim 5, and further comprising the step of:

diverting a portion of the cooling fluid from the first leg of the serpentine cooling circuit to cool a trailing edge of the airfoil.

8. A turbine blade comprising:
a leading edge and a trailing edge;
a pressure side wall and a suction side wall extending between the leading and the trailing edges and defining an airfoil;

a triple pass serpentine flowing cooling circuit with a first leg near the trailing edge of the airfoil and a third leg located around the airfoil mid-cord region and partially bounded by the pressure side wall of the airfoil such that near wall cooling of the pressure side wall is performed;

a row of film cooling holes connected to the third leg to discharge film cooling air onto the pressure side wall of the airfoil;

a suction side wall compartment located on the suction side wall and opposed to the third leg such that near wall cooling of the suction side wall is performed; and, a plurality of metering and impingement cooling holes connecting the third leg to the suction side wall compartment to produce impingement and near wall cooling of the suction side wall of the airfoil.

9. The turbine blade of claim 8, and further comprising:
a row of film cooling holes connected to the suction side wall compartment to produce film cooling of the suction side wall.

10. The turbine blade of claim 9, and further comprising:
all of the cooling air supplied to the suction side wall compartment comes from the third leg of the serpentine flowing cooling circuit.

11. The turbine blade of claim 9, and further comprising:
the film cooling holes for the third leg and the suction side wall compartment discharge the film cooling air onto the hottest sections of the mid-chord pressure and suction walls.

12. The turbine blade of claim 9, and further comprising:
the pressure in the third leg is greater than the pressure in the suction side wall compartment.

13. The turbine blade of claim 9, and further comprising:
the first and second legs of the aft flowing triple pass serpentine flowing cooling circuit both extend between the pressure side and suction side walls of the airfoil.

* * * * *